May 10, 1949. E. R. GALBRAITH 2,469,821
TOOLHOLDER AND ADAPTER CHUCK
FOR MOTOR DRIVEN TOOLS
Filed March 22, 1947
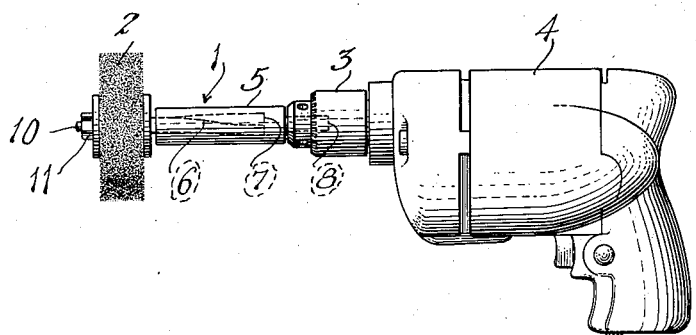
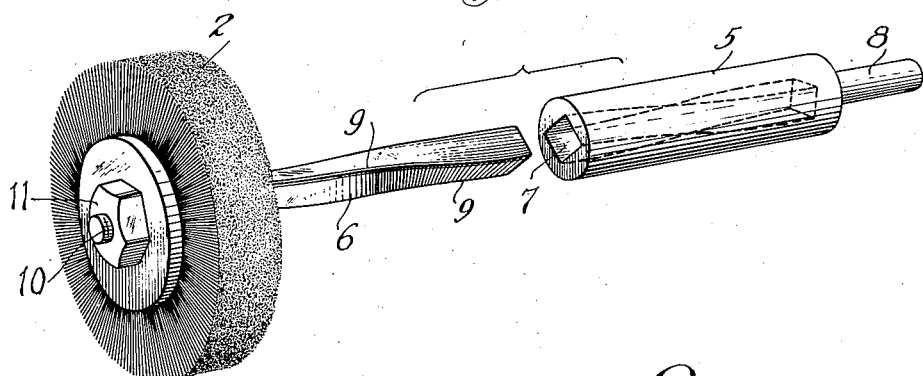
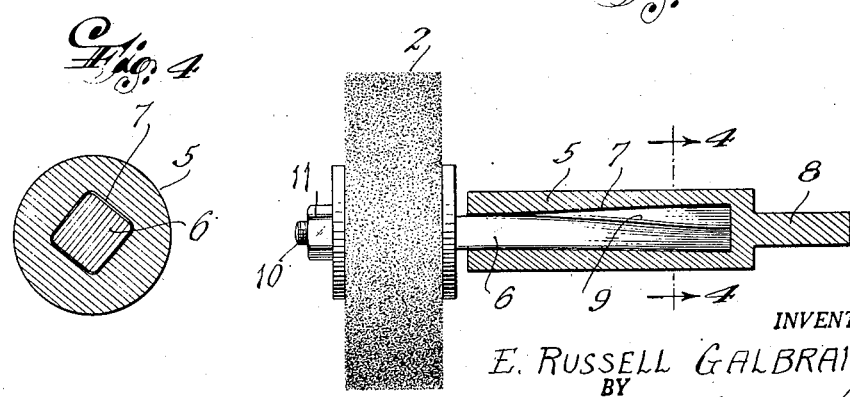
INVENTOR.
E. RUSSELL GALBRAITH,
BY
ATTORNEY Patented May 10, 1949

2,469,821

UNITED STATES PATENT OFFICE 2,469,821

TOOLHOLDER AND ADAPTER CHUCK FOR MOTOR-DRIVEN TOOLS

Edward Russell Galbraith, East Orange, N. J.

Application March 22, 1947, Serial No. 736,607

2 Claims. (Cl. 279—99)

This invention relates particularly to an adapter chuck for separably connecting a cleaning tool such as a brush or the like to a rotatable driving shaft.

When soldering copper tubing to solder fittings, as used for example in the plumbing and heating industry, it is necessary to clean the outside of the tubing and the inside of the fitting thoroughly in order to prepare the surfaces for the solder and ensure a tight satisfactory joint. Heretofore this cleaning has been done by a hand brush or a piece of sand cloth or the like, which is a slow and inefficient operation.

It is a prime object of the present invention to provide an adapter that shall include a tool holder and a chuck whereby a rotary brush or like tool may be operatively and detachably connected to a motor.

Another object is to provide a two-part adapter with means for easily separating said parts whereby tools of different sizes may be connected to the motor.

A further object is to provide a two-part adapter of this kind that is readily separable for attachment of different sized tools but cannot accidentally be separated during cleaning operations.

Still another object is to provide an adapter of this character that is simple in construction and economical to manufacture.

Other objects and advantages of the invention will be apparent from the description thereof to follow taken in connection with the accompanying drawing in which—

Figure 1 is a side elevational view of an adapter embodying my invention connecting a rotary brush to a motor.

Figure 2 is an enlarged perspective view of the adapter disassembled with the brush attached.

Figure 3 is an enlarged sectional view of the adapter assembled with the brush attached.

Figure 4 is a cross sectional view taken on the plane of the line 4—4 of Figure 3.

Referring to the drawing, the improved adapter 1 is illustrated as connecting a wire brush 2 to an ordinary chuck 3 driven by a motor 4. It comprises a metal cylindrical socket member 5 and an elongated detachable metal shaft 6. The member 5 is formed with a central or coaxial socket 7 extending substantially the length thereof and with an integrally formed shank portion 8 of a suitable diameter to enable it to be accommodated to the chuck 3.

The shaft 6 is substantially square in cross-section throughout its length but is formed with a slight helical twist lengthwise thereof providing curved shoulders 9 therealong. The socket 7 in member 5 is similarly shaped to receive the shaft 6 with a sliding fit. In other words, the shank is rectangular polygonal in cross-section with its angles constituting portions of co-axial longitudinal helices of long pitch, and said socket has angles corresponding in shape to the angles of said shank and constituting guides therefor, whereby said shank is freely longitudinally slidably receivable into and removable from said socket while said socket member is stationary, and said angles of the shaft interlock with said angles of the socket to prevent separation of said shank from said socket member during rotation of the latter by a power-rotated chuck. At one end, the shaft is formed with an integral externally screw-threaded stem 10 for insertion axially through the brush 2. A nut 11 on the outer end of the stem fastens the brush on to the shaft.

The outer end of the socket portion 7 may be slightly rounded and countersunk to facilitate and guide the insertion of the shaft therein.

In use, when the adapter is rotating, the curved shoulders of the shaft engage the similarly shaped wall portions of the socket portion thereby preventing any creepage or longitudinal movement of the shaft relative to the cylindrical member 5 so that any accidental displacement of the shaft from the socket is prevented. However, when the socket is at rest, the shaft can very easily be detached from the socket for any desired purpose by a simple outward longitudinal pull on the shaft.

While the adapter is illustrated as connecting a rotary brush to a motor, it will be understood that it is suitable for attaching any desired rotating tool, such as a buffer, grinder or the like.

What I claim is:

1. A tool holder-adapter chuck comprising a tool-holding shank and a socket member for cooperation therewith having a co-axial opening through one end and its other end formed for attachment to a rotatable chuck, said shank being of regular polygonal cross-section with its angles constituting portions of co-axial longitudinal helices of long pitch, and said socket having angles corresponding in shape to the angles of said shank and constituting guides therefor, whereby said shank is freely longitudinally slidably receivable into and removable from said socket while said socket member is stationary, and said angles of the shaft interlock with said angles of the socket to prevent separation of said shank from said socket member during rotation of the latter by a power-rotated chuck.

2. A tool holder-adapter chuck comprising a shank having means at one end for mounting a tool and its other end portion square in cross-section with its angles constituting portions of different longitudinal co-axial helices of long pitch, and a socket member having a co-axial socket opening through one end and its other end formed for attachment to a power-rotatable chuck, said socket having angles shaped correspondingly to and constituting guides for said angles of said shank, whereby said shank can be freely longitudinally slidably inserted into and removed from said socket when the socket member is stationary, and said angles of the shank interlock with said angles of said socket to prevent removal of said shank from said socket during rotation of said socket member by a power-rotated chuck.

E. RUSSELL GALBRAITH.

REFERENCES CITED

The following references are of record in the file of this patent:

UNITED STATES PATENTS

| Number | Name | Date |
|---|---|---|
| 260,314 | Parks et al. | June 27, 1882 |
| 1,372,577 | Wallenberg | Mar. 22, 1921 |
| 1,524,633 | Polican | Jan. 27, 1925 |

FOREIGN PATENTS

| Number | Country | Date |
|---|---|---|
| 397,185 | Great Britain | 1933 |